UNITED STATES PATENT OFFICE.

THOMAS B. ALLEN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

PROCESS OF TREATING METALLIC ARTICLES.

981,513.  Specification of Letters Patent.  Patented Jan. 10, 1911.

No Drawing.  Application filed August 31, 1910.  Serial No. 579,859.

*To all whom it may concern:*

Be it known that I, THOMAS B. ALLEN, of Niagara Falls, in the county of Niagara and State of New York, have invented a Process of Treating Metallic Articles, of which the following is a full, clear, and exact description.

My invention relates to a process of alloying or impregnating the outer portions of metals and metal articles with silicon, in order to give them corrosion-resisting and other valuable properties.

It is well known that many silicides and silicon alloys, such as those of iron, chromium, manganese, nickel, cobalt, etc., have corrosion-resisting qualities, and many attempts have been made to manufacture therefrom useful articles, such as crucibles, vats, pipes, etc., by casting or other processes in order to utilize these non-corrosive properties. But it has been found that these methods are accompanied by many great difficulties, and that articles so formed have very little mechanical strength, due to the fact that almost all corrosive-resisting silicides and silicon alloys are very brittle.

I have discovered that if metals are heated in contact with silicon under suitable conditions, they absorb silicon by a cementation action at a temperature below the melting points of both the metal and silicon; and that I can thus produce articles having all or part of the surface composed of an alloy of the metal and silicon. The articles thus made are of great mechanical strength, and are very resistant to the action of acids and other corrosive substances.

I will now describe a preferred mode of carrying out my invention, and will use iron as a typical metal, meaning by the term "iron" all forms and conditions of this material, such as cast iron, malleable iron, steel, etc. It will be understood, however, that I may apply the process to any or all metals which form silicides or alloys, especially those which are resistant to the action of corrosive substances.

I take an iron article and first clean it to remove rust, grease, dirt and other similar foreign materials, by appropriate mechanical or chemical treatment. I then place the article in powdered silicon and heat it to a temperature preferably between 700° C. and 1350° C. The silicon is only applied to the surfaces where it is desired to obtain the corrosive-resisting layer, and the other parts of the surface may be covered with some inert material, such as sand. The heating of the article should be carried out in such a manner as to have either a neutral or a reducing atmosphere in contact with the silicon and the article; since I have found that an oxidizing atmosphere acts detrimentally, probably by oxidizing the iron article and the silicon and thus preventing a proper absorption of the silicon by the iron.

The heating is usually continued for a period of from twenty-four to seventy-two hours, during which a ferro-silicon is formed by absorption of the silicon in the surface portion of the article, this being usually of crystalline form. I have found that the degree of temperature and length of heating determine both the depth of the layer of ferro-silicon and also the percentage of silicon in the alloy, and I may therefore vary the nature of my product by suitably changing the conditions of treatment. I have also found that when silicon is thus absorbed, it at times leaves some of the iron unchanged, and on examination, I have found the interstitial layers between the crystals of ferro-silicon in the coating to be composed of iron. The existence of the iron in the interstices of the ferro-silicon is a great disadvantage, and I have found that this remaining iron may be converted into ferro-silicon by re-heating the treated article in contact with powdered silicon in a non-oxidizing atmosphere and at a temperature below the melting point of the article and the silicon, thus repeating the original process.

The advantages of my invention will be obvious to those skilled in the art. The silicon penetrates the iron in a remarkably uniform manner, and below the depth to which the silicon penetrates, the iron is unchanged. As above stated, the silicon which penetrates the iron unites with it to form ferro-silicon; and in articles composed of cast iron or high carbon steels, the silicon also reacts with the iron carbids present to form ferro-silicon and precipitate the contained carbon as graphite. The article treated remains practically unchanged as regards its shape and dimensions when subjected to my process. A true absorption or cementation of the silicon by the iron occurs and I can obtain my finished articles by forming them into the desired shape from the iron in any desired manner.

I have also found that ferro-silicon with a high percentage of silicon may also be used instead of pure silicon, and by the term "silicon" in my claims, I intend to cover silicon or its compounds or alloys. When treating metals other than iron, the silicon alloys of these metals may preferably be used in place of ferro-silicon.

I claim:

1. A metallic article having a surface portion composed of an alloy of silicon and the metal of the article.

2. An iron article having at least a part of its integral surface composed of ferro-silicon.

3. As a new article of manufacture, a metallic article having a surface portion impregnated or alloyed with cemented silicon.

4. The process of treating metal articles which consists in heating said articles with silicon to a temperature below the melting points of the metal and the silicon.

5. The process of forming a corrosive resisting surface on metal articles which consists in heating said articles in contact with silicon to a temperature below the melting point of the metal and silicon, in a non-oxidizing atmosphere.

6. The process of converting a surface portion of a metal article into an alloy of silicon, which consists in heating said article in contact with silicon to a temperature below the melting point of silicon in a non-oxidizing atmosphere.

7. The process of forming a corrosive-resisting surface on metal articles, which consists in heating said articles with silicon to a temperature below the melting point of the metal and silicon, and re-heating said article with silicon to a temperature below the melting point of the metal and silicon.

8. The process of forming a corrosive-resisting surface on metal articles, which consists in heating said articles with silicon to a temperature below the melting point of the metal and silicon in a non-oxidizing atmosphere, and re-heating said article with silicon to a temperature below the melting point of the metal and silicon in a non-oxidizing atmosphere.

In testimony whereof, I have hereunto set my hand.

THOS. B. ALLEN.

Witnesses:
 EDMUND S. SMITH,
 R. B. MANLEY.